US008665336B2

(12) United States Patent
Ohshima

(10) Patent No.: US 8,665,336 B2
(45) Date of Patent: Mar. 4, 2014

(54) IMAGING APPARATUS, CONTROL METHOD AND STORAGE MEDIUM

(75) Inventor: Hideaki Ohshima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/837,360

(22) Filed: Jul. 15, 2010

(65) Prior Publication Data

US 2011/0019008 A1 Jan. 27, 2011

(30) Foreign Application Priority Data

Jul. 24, 2009 (JP) .................................. 2009-173408

(51) Int. Cl.
*H04N 5/225* (2006.01)
*H04N 5/232* (2006.01)
*H04N 5/76* (2006.01)

(52) U.S. Cl.
USPC ................ 348/207.1; 348/207.11; 348/211.1; 348/231.3

(58) Field of Classification Search
USPC ........ 348/207.1, 207.11, 211.1, 211.2, 211.3, 348/231.2, 231.3
See application file for complete search history.

(56) References Cited

U.S. PATENT DOCUMENTS

| 6,810,441 | B1 * | 10/2004 | Habuto et al. .............. 348/231.9 |
|---|---|---|---|
| 2002/0101515 | A1 * | 8/2002 | Yoshida et al. ................ 348/211 |
| 2004/0223057 | A1 * | 11/2004 | Oura et al. .................. 348/207.1 |
| 2004/0252203 | A1 * | 12/2004 | Kitajima ..................... 348/222.1 |
| 2007/0076251 | A1 * | 4/2007 | Yasuda .......................... 358/474 |
| 2008/0048861 | A1 * | 2/2008 | Naidoo et al. ................. 340/541 |
| 2008/0068675 | A1 * | 3/2008 | Sakuda .......................... 358/474 |
| 2009/0034951 | A1 * | 2/2009 | Kawasaki ................. 348/207.11 |
| 2009/0040331 | A1 * | 2/2009 | Kitagawa ................... 348/222.1 |
| 2009/0086030 | A1 * | 4/2009 | Takamiya .................. 348/207.1 |
| 2010/0002095 | A1 * | 1/2010 | Nagao et al. ............... 348/231.2 |

FOREIGN PATENT DOCUMENTS

| JP | 2007-97052 A | 4/2007 |
|---|---|---|
| JP | 2008-42552 A | 2/2008 |

* cited by examiner

*Primary Examiner* — Nhan T Tran
(74) *Attorney, Agent, or Firm* — Carter, DeLuca, Farrell & Schmidt LLP

(57) ABSTRACT

An imaging apparatus notifies, to an external apparatus, a media content stored in a storage medium of the imaging apparatus, and a control content for use in a control of the imaging apparatus and having a same format as the format of the media content. When the control content is requested from the external apparatus, the imaging apparatus performs a control corresponding to the requested control content. The imaging apparatus determines whether the imaging apparatus notifies the media content or the control content according to an operation mode of the imaging apparatus.

24 Claims, 8 Drawing Sheets

IMAGING APPARATUS, CONTROL METHOD AND STORAGE MEDIUM

BACKGROUND OF THE INVENTION

1. Field of the Invention

The present invention relates to an imaging apparatus, a control method, and a program.

2. Description of the Related Art

Recently, guidelines for interoperably sharing digital contents such as still images, moving images, and audio data between appliances of different manufactures have been established by Digital Living Network Alliance (registered trademark) (DLNA), and have been becoming widespread. Digital contents are exchanged between appliances complying with the DLNA guidelines, such as between a digital media server (DMS) which provides digital contents and a digital media player (DMP) which displays digital contents. The DLNA guidelines enable a DMP to display digital contents provided by a DMS.

"Japanese Patent Application Laid-Open No. 2007-97052" discusses a technique enabling image data read by a reading apparatus such as a scanner to be displayed on an image display apparatus in real time.

"Japanese Patent Application Laid-Open No. 2008-42552" discusses a technique enabling image data read by a reading apparatus such as a scanner to be directly transmitted to an image display apparatus through a network and displayed on the image display apparatus.

However, "Japanese Patent Application Laid-Open No. 2007-97052" discusses only a technique regarding a control enabling the display apparatus side to initiate a reading operation at the reading apparatus side which is as an image provider side, and does not discuss techniques regarding controls enabling other operations.

On the other hand, "Japanese Patent Application Laid-Open No. 2008-42552" discusses a technique regarding a control enabling a change in settings, besides a technique regarding a control enabling the display apparatus side to initiate a reading operation at the reading apparatus side which is an image provider side. However, according to the technique discussed in "Japanese Patent Application Laid-Open No. 2008-42552", the display apparatus side should have a specific file for use in a determination of setting values.

SUMMARY OF THE INVENTION

According to an aspect of the present invention, there is provided an imaging apparatus communicable to an external apparatus, the imaging apparatus includes a notification unit configured to notify a media content and a control content to the external apparatus, the media content being stored in a storage medium of the imaging apparatus, the control content having a same format as the format of the media content and being used for a control of the imaging apparatus and a control unit configured to, when the control content is requested from the external apparatus, perform a control corresponding to the requested control content. The notification unit determines whether the notification unit notifies the media content or the control content according to an operation mode of the imaging apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

DESCRIPTION OF THE EMBODIMENTS

Various exemplary embodiments, features, and aspects of the present invention will be described in detail below with reference to the attached drawings.

In the following exemplary embodiments, a digital camera 100, which is an example of an imaging apparatus, serves as a content providing server, and a display apparatus 200 serves as a content display apparatus. The digital camera 100 and the display apparatus 200 are communicably connected to each other via a network.

Figure 1:
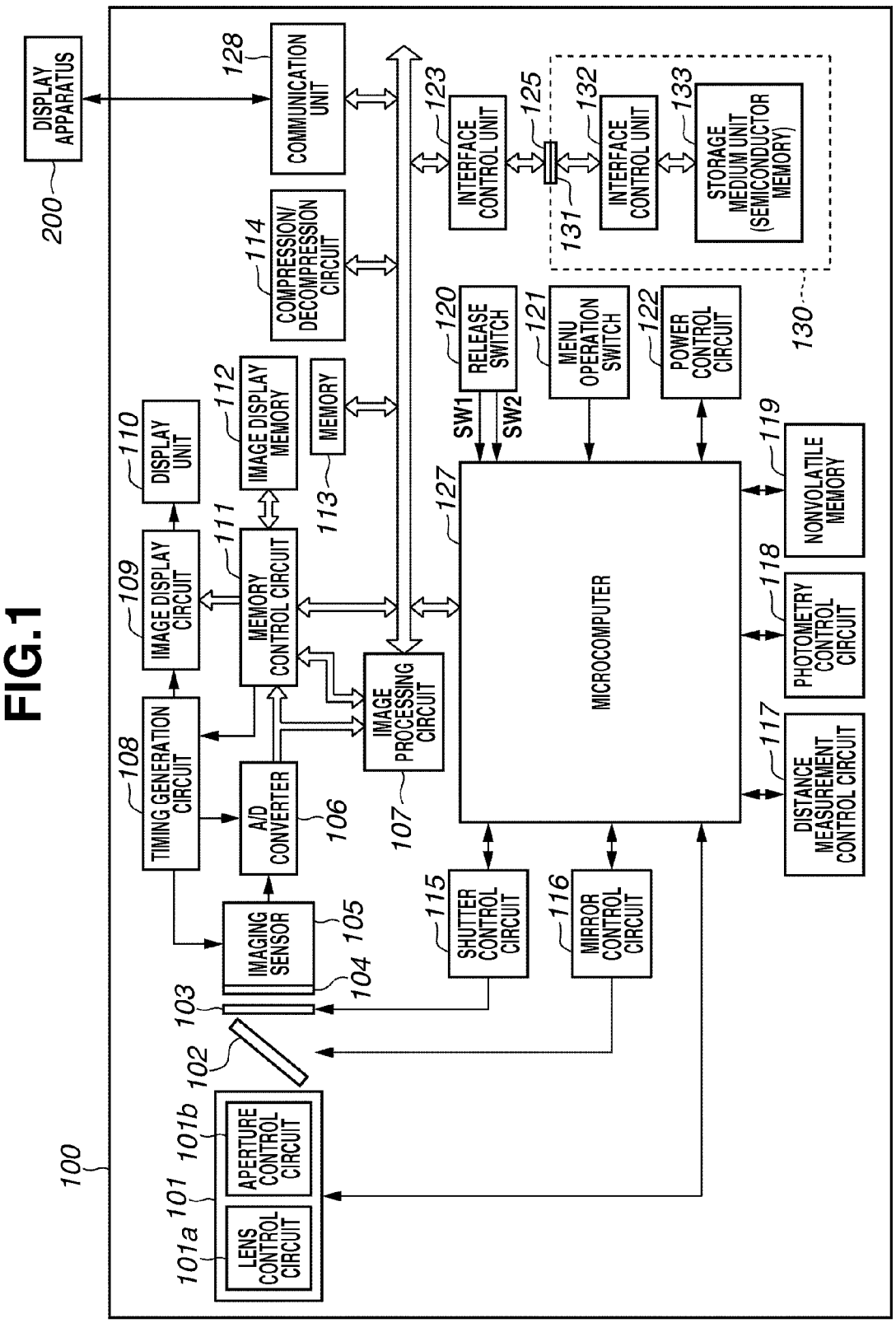
FIG. 1 illustrates an example of a hardware configuration of a digital camera.

FIG. 1 illustrates an example of a hardware configuration of a digital camera in a first exemplary embodiment of the present invention.

The digital camera 100 includes a lens unit 101. The lens unit 101 is constituted by a plurality of lenses, and is interchangeable. The lens unit 101 includes a lens control circuit 101a and an aperture control circuit 101b, and can communicate with a microcomputer 127. The microcomputer 127 controls the lens control circuit 101a, and performs focusing by moving a focusing lens in the lens unit 101. The lens moving amount at this time is calculated based on an output from a distance measurement control circuit 117. Further, the microcomputer 127 controls the aperture control circuit 101b to change an optical aperture value.

Further, the digital camera 100 includes a quick return mirror 102, a shutter 103, an optical filter 104, an imaging sensor 105, an A/D converter 106, and a timing generation circuit 108. The quick return mirror 102 is movable between a position where the quick return mirror 102 is disposed in a photographic optical path to guide object light from the lens unit 101 to a finder optical system (not shown), and a position where the quick return mirror 102 is retracted to the outside of the photographic optical path. The optical filter 104 is covered with a dust preventing glass. The image sensor 105 converts an optical image into an electrical signal. The A/D converter 106 converts an analog signal output from the image sensor 105 to a digital signal. The timing generation circuit 108 supplies a clock signal and a control signal to the image sensor 105 and the A/D converter 106. The timing generation circuit 108 is controlled by a memory control circuit 111 which will be described later, and the microcomputer 127.

Further, the digital camera 100 includes an image processing circuit 107, an image display circuit 109, the memory control circuit 111, an image display memory 112, a display unit 110, and a memory 113. The image processing circuit 107 performs, for example, predetermined pixel interpolation processing and development processing for data from the A/D converter 106 or image data from the memory control circuit 111 based on processing data attached to the image data. The memory control circuit 111 controls the A/D converter 106, the image processing circuit 107, the timing generation circuit 108, the image display memory 112, the memory 113, and a compression/decompression circuit 114. The signal converted by the A/D converter 106 is written into the image display memory 112 or the memory 113 through the image processing circuit 107 and the memory control circuit 111.

The display unit 110 is a display constituted by, for example, a thin film transistor liquid crystal display (TFT-LCD). The display image data written in the image display memory 112 is displayed on the display unit 110 by the image display circuit 109. The memory 113 is used as an area of an image buffer for temporarily storing shot uncompressed image data. Further, the memory 113 is used as an area of a work buffer for storing temporarily used data such as: processing data for use in development processing of image data by the image processing circuit 107; results of automatic focus, automatic exposure, and automatic white balance (AF/AE/AWB) calculations; and others. Further, the memory 113 is a memory including an area used as a file buffer for storing image data compressed by the compression/decompression circuit 114. The memory 113 has a sufficient capacity for storing a predetermined number of still images and a predetermined time of moving images. Therefore, it is possible to write a large number of images into the memory 113 at high speed even during continuous shooting when a plurality of still images is continuously shot.

Further, the digital camera 100 includes the compression/decompression circuit 114, a shutter control circuit 115, a mirror control circuit 116, the distance measurement control circuit 117, a photometry control circuit 118, the microcomputer 127, and a nonvolatile memory 119.

The compression/decompression circuit 114 compresses image data into Joint Photographic Experts Group (JPEG) data by, for example, adaptive discrete cosine transformation (ADCT), or decompresses compressed image data. The compression/decompression circuit 114 reads in image data stored in the memory 113, compresses or decompresses it, and writes the processed data into the memory 113. The shutter control circuit 115 controls a shutter 103. The mirror control circuit 116 controls and drives the quick return mirror 102 to the inside and the outside of the photographic optical path. The distance measurement control circuit 117 measures a distance from the camera to an object, and the focusing lens of the lens unit 101 is controlled based on the measurement output therefrom. The photometry control circuit 118 measures the brightness of an object, and controls the exposure based on the measurement output therefrom. The microcomputer 127 provides an overall control of the digital camera 100. The nonvolatile memory 119 stores various programs such as a program for shooting, a program for image processing, and a program for storing image file data generated at a storage medium into the storage medium. Further, the nonvolatile memory 119 stores various programs such as an operating system (OS) implementing and executing multitask of the above-mentioned programs, adjustment values for use in various controls, and the like.

Further, the digital camera 100 includes various operation units. The operation units are, for example, various buttons and switches, a dial, and a touch panel through which a user inputs various operation instructions to the microcomputer 127. The operation units will be described in more detail. A release switch 120 is constituted by an SW1 which is turned on by half-pressing of the release switch 120, and an SW2 which is turned on by full-pressing of the release switch 120. When the SW1 of the release switch 120 is turned on, the microcomputer 127 starts a shooting preparation operation that is, for example, the automatic focus (AF) processing and the automatic exposure (AE) processing.

On the other hand, when the SW2 of the release switch 120 is turned on, the microcomputer 127 starts a series of processing which is described below. First, the microcomputer 127 performs the imaging processing of reading out a signal from the imaging sensor 105 and writing the image data into the memory 113 through the A/D converter 106 and the memory control circuit 111. Next, the microcomputer 127 performs the white balance correction processing according to a white balance mode which is set for image data, and the development processing with use of the image processing circuit 107. Then, the microcomputer 127 performs the recording processing of reading out the developed image data from the memory 113, compressing the image data at the compression/decompression circuit 114, and writing the image data into a storage medium.

Further, a menu operation switch 121 includes a not-shown menu key, set key, and four-way selector key. A user can perform various operations such as changing various settings including the shooting conditions of the camera and the development conditions, and selecting a power saving mode for an external storage medium using the menu operation switch 121, while viewing a screen display shown on the display unit 110.

Next, components and ancillary units connected to the digital camera 100 will be described. The digital camera 100 includes a power control circuit 122, an interface control unit 123, and a connector 125. The power control circuit 122 is constituted by, for example, a battery detection circuit, a direct current to direct current (DC-DC) converter, and a switching circuit for switching a block to be energized. The power control circuit 122 detects whether or not the battery is mounted, what kind of battery is used, and how much the remaining capacity of the battery is. The power control circuit 122 controls the DC-DC converter based on the detection results and an instruction from the microcomputer 127, and supplies a necessary voltage for a necessary time to the respective units including a storage medium.

The interface control unit 123 controls a storage medium such as a memory card. The connector 125 enables a connection to a storage medium such as a memory card.

Further, the digital camera 100 includes a communication unit 128. The communication unit 128 controls transmission and reception of information and contents between the digital camera 100 and the display apparatus 200. The communication unit 128 controls communication between the digital camera 100 and the display apparatus 200 through a communication path such as a wireless local area network (wireless LAN) or a wired local area network (wired LAN).

Further, the digital camera includes a storage medium 130 such as a memory card or a hard disk. The storage medium 130 includes a storage medium unit 133 constituted by a semiconductor memory, an interface control unit 132 which serves as an interface to the digital camera 100 and controls the storage medium unit 133, and a connector 131 enabling a connection to the digital camera. In the present exemplary embodiment, the storage medium 130 is embodied by a memory card constituted by a semiconductor memory. The casing of the digital camera 100 is provided with an insertion opening for inserting the storage medium 130. Further, an openable and closable cover for closing the insertion opening is disposed near the insertion opening of the digital camera 100.

The microcomputer 127 executes the programs, which realize the processing on the digital camera 100 side illustrated in the flowcharts which will be described later.

The display apparatus 200 includes, for example, a central processing unit (CPU), a memory, and a display, as the hardware configuration thereof. The CPU of the display apparatus 200 executes programs stored in the memory of the display apparatus 200, which realize the processing on the display apparatus 200 side illustrated in the flowcharts which will be described later.

<Flow of Content Providing Processing>

Figure 2:
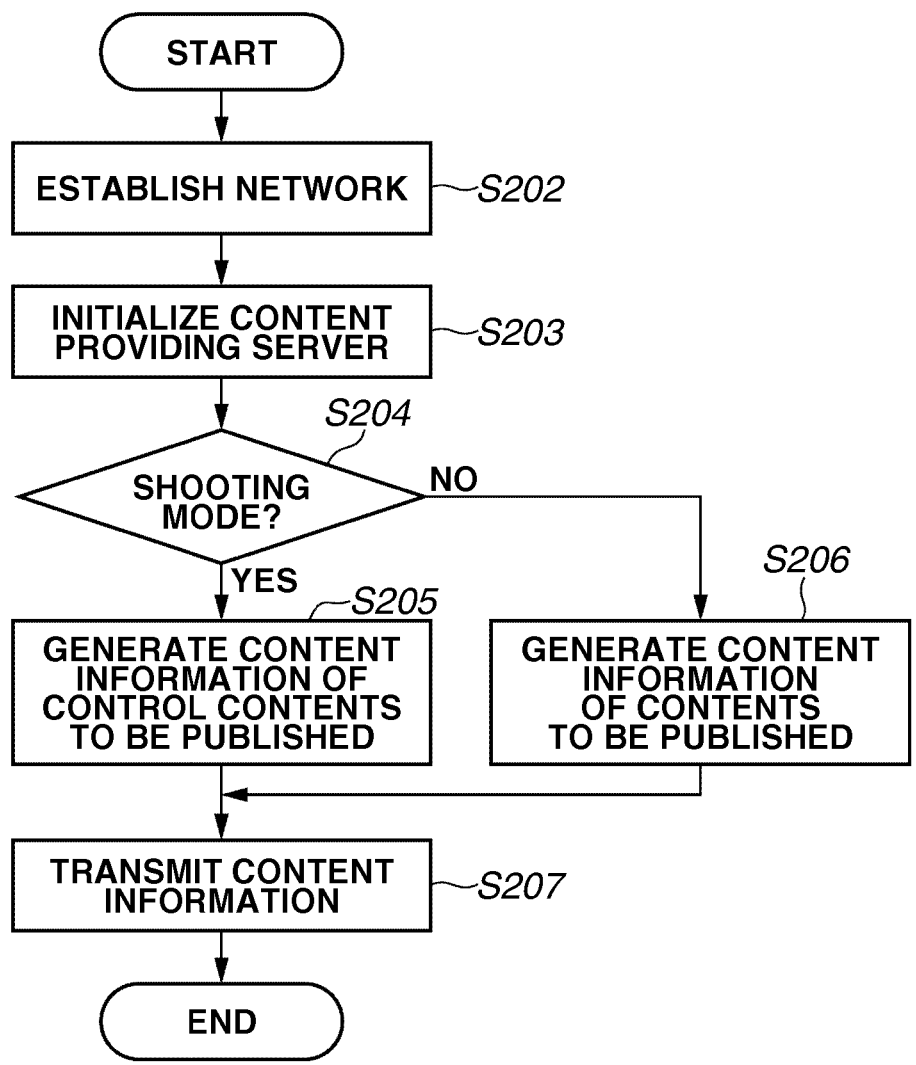
FIG. 2 is a flow chart illustrating an example of a processing flow from power-on of the digital camera until transmission of content information to be published in a display apparatus.

FIG. 2 is a flowchart illustrating an example of a processing flow from power-on of the digital camera 100 until transmission of content information to be published on the display apparatus 200.

The digital camera 100 is turned on in response to, for example, a user's operation, and starts the following processing. In step S202, the digital camera 100 establishes a network through the communication unit 128. For establishment of a network, in the digital camera 100, the settings of the required items such as the IP address thereof should be completed. In addition to the completion of the settings of the required items, in the digital camera 100, a network configuration should be established in advance under an appropriate protocol such as Transmission Control Protocol/Internet Protocol (TCP/IP).

In step S203, the digital camera 100 performs the initialization processing to function as a content providing server. In the present exemplary embodiment, the digital camera 100 functions as a digital media server (DMS). Further, the digital camera 100 has the function of shooting still images and the function of shooting moving images. Further, the digital camera 100 has the function of changing the settings of the camera in each shooting mode (still image shooting mode and moving image shooting mode).

In step S204, the digital camera 100 determines whether or not the current operation mode thereof is the shooting mode. For example, if the digital camera 100 is configured such that the operation mode thereof is switched between the shooting mode (still image shooting mode and moving image shooting mode) and the reproduction mode by an operation of a switch, the digital camera 100 determines whether or not the current operation mode thereof is the shooting mode based on the state of the switch. Alternatively, for example, if the digital camera 100 is configured such that the operation mode thereof is switched by a user' selection at a menu screen, the digital camera 100 determines whether or not the current operation mode thereof is the shooting mode based on the operation mode selected by the user. If the current operation mode of the digital camera 100 is the shooting mode (YES in step S204), then the digital camera 100 proceeds to step S205 to perform the operation for publishing control contents on the display apparatus 200. On the other hand, if the current operation mode of the digital camera 100 is not the shooting mode (for example, the reproduction mode) (NO in step S204), the digital camera 100 proceeds to step S206 to publish media contents stored in, for example, the storage medium 130 on the display apparatus 200. Here, the publication of the media contents refers to a case where the digital camera 100 notifies the display apparatus 200 of contents information that its own machine manages.

In step S205, the digital camera 100 generates a control content associated with a still image shooting start control, in the format of a still image content to be generated by still image shooting (for example, the JPEG file format). Further, the digital camera 100 generates a control content associated with a moving image shooting start control, in the format of a moving image content to be generated by moving image shooting (for example, the MPEG 4 file format). Further, in the present exemplary embodiment, the digital camera 100 generates a control content associated with a camera setting change, in the format of an audio content (for example, the MP3 file format). Still image content, moving image content, and audio content are categorized as a media content.

Figure 3:
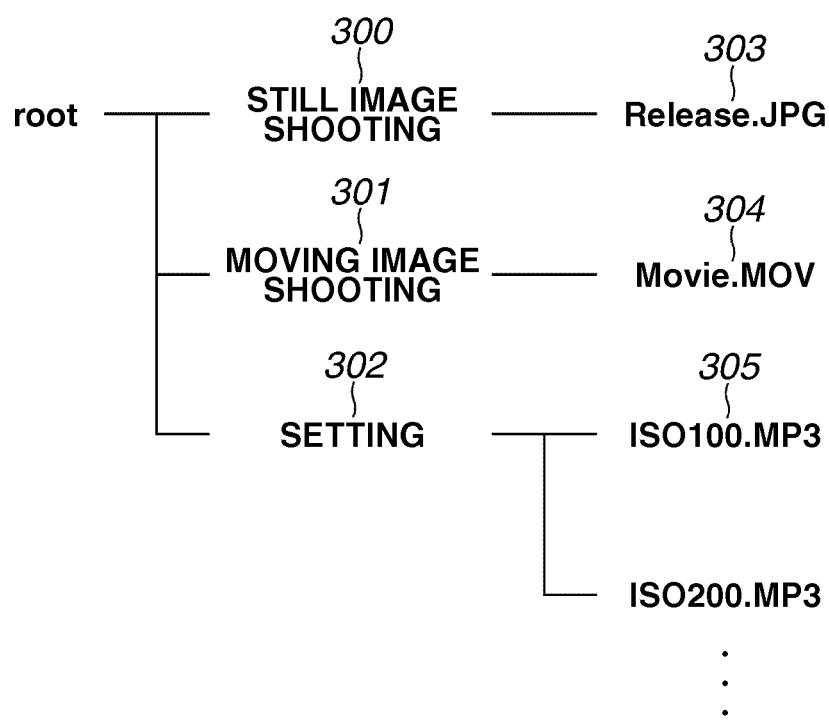
FIG. 3 illustrates an example of a folder structure of control contents published in the display apparatus.

FIG. 3 illustrates an example of a folder structure of control contents published on the display apparatus 200. In the example shown in FIG. 3, there is a control content "Release. JPG" (303) associated with the still image shooting start control (control information of still image shooting start) immediately under a still image shooting folder 300. When the display apparatus 200 requests acquisition of the control content "Release.JPG" (303), the digital camera 100 starts shooting of a still image. More specifically, the control content is a content for performing control such that an access of an external apparatus to the content in the digital camera 100 causes the digital camera 100 to execute a predetermined operation. There is a control content "Movie.MOV" (304) associated with the moving image shooting start control (control information of moving image shooting start) immediately under a moving image shooting folder 301. In the present exemplary embodiment, a content of a setting change is provided as a control content in the MP3 format. However, the format of this content is not limited to the audio file format and may be embodied by any format. In the example shown in FIG. 3, there is a control content "ISO100.MP3" (305) associated with controlling a change to ISO100 (control information of a setting change) immediately under a setting folder 302.

Returning to FIG. 2, in step S206, the digital camera 100 generates content information about media contents stored in, for example, the storage medium 130 mounted in the digital camera 100.

Figure 4:
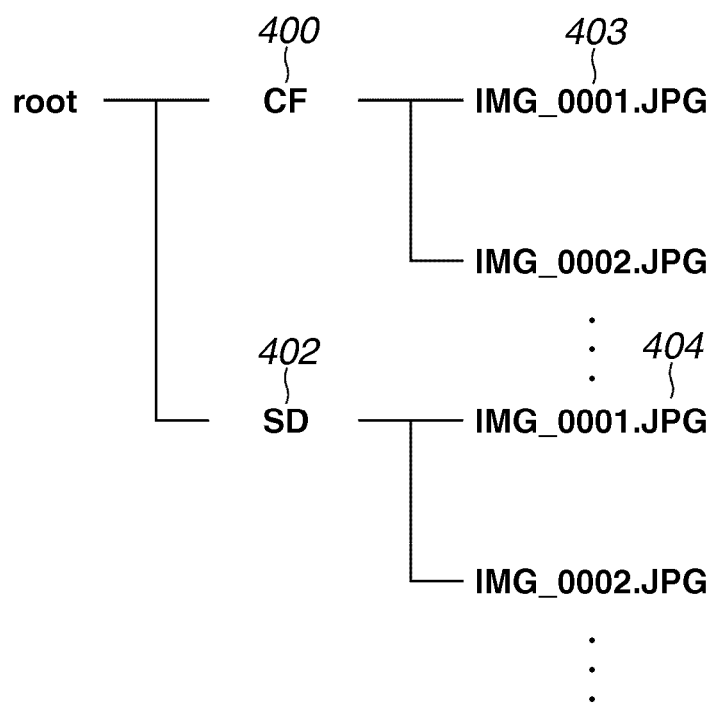
FIG. 4 illustrates an example of a folder structure of contents stored in a storage medium, which is published in the display apparatus.

FIG. 4 illustrates an example of a folder structure containing media contents stored in the storage medium, which is published on the display apparatus 200. The media content is, for example, an image file and a music file which are generally called as "content". In the present exemplary embodiment, the storage medium 130 comprises a plurality of storage media, a compact flash (CF) card and a super density (SD) card.

In the example shown in FIG. 4, media contents "IMG_0001.JPG" and "IMG_0002.JPG" (403) stored in the CF card exist immediately under a CF folder 400. Media contents "IMG_0001.JPG" and "IMG_0002.JPG" (404) stored in the SD card exist immediately under an SD folder 402.

Returning to FIG. 2, in step S207, the digital camera 100 transmits the content information (for example, information shown in FIG. 3 or 4) generated in step S205 or step S206 in response to an information acquisition request from the display apparatus 200. More specifically, if it is determined in step S204 that the current operation mode is the shooting mode, then the digital camera 100 transmits the control content information but does not transmit the media content information. On the other hand, if it is determined in step S204 that the current operation mode is not the shooting mode, then the digital camera 100 transmits the media content information but does not transmit the control content information.

The digital camera 100 transmits the content information generated in step S205 or S206 to the display apparatus 200 in response to the information acquisition request from the display apparatus 200.

Next, an example of processing will be described which the digital camera 100 performs when the display apparatus 200 requests a control content after the content information is provided. In the present exemplary embodiment, the digital camera 100 operates in the following manner when the provided content information contains a control content of still image (still image control content), and the display apparatus 200 requests that still image control content.

<Still Image Shooting Operation Sequence>

Figure 5:
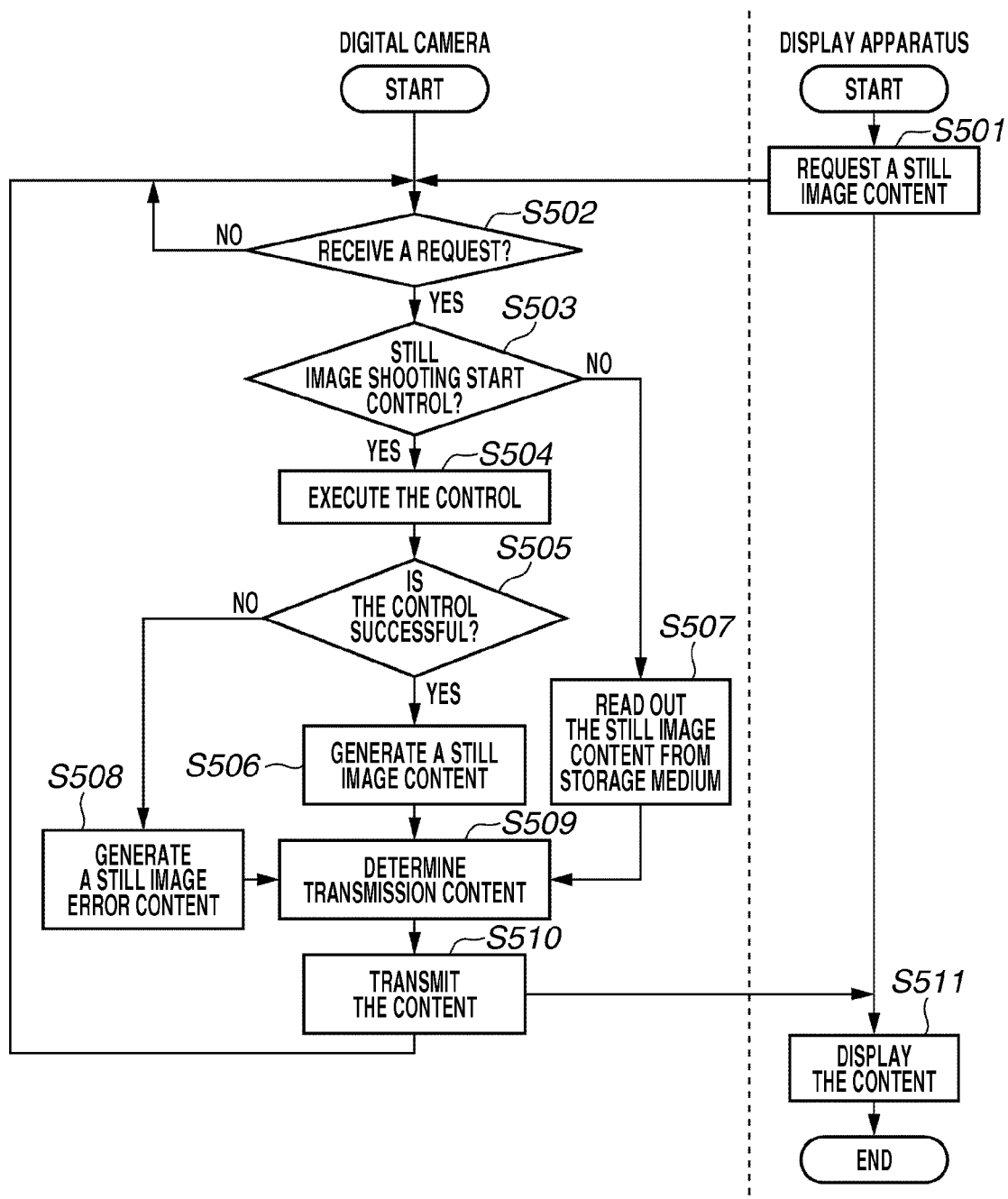
FIG. 5 is a flowchart illustrating a processing flow from when a request for a still image content is issued by the display apparatus to the digital camera, until reproduction of the still image starts on the display apparatus.

FIG. 5 is a flowchart illustrating a processing flow from when a request for a still image content is issued by the display apparatus 200 to the digital camera 100, until reproduction of the still image starts on the display apparatus 200.

In step S501, the display apparatus 200 requests the digital camera 100 to transmit a still image content.

In step S502, the digital camera 100 determines whether or not the digital camera 100 receives a request (transmission request) from the display apparatus 200. If the digital camera 100 receives a request from the display apparatus 200 (YES in step S502), the digital camera 100 proceeds to step S503. If the digital camera 100 does not receive a request from the display apparatus 200 (NO in step S502), then the digital camera 100 waits until reception of a request.

In step S503, the digital camera 100 determines whether or not the request from the display apparatus 200 is a request for the still image shooting start control content. For example, the digital camera 100 determines whether the request is the still image shooting start control based on whether the request contains "Release.JPG" (303). More specifically, the digital camera 100 determines that the request is the still image shooting start control (YES in step S503) if the request contains "Release.JPG" (303), and then proceeds to step S504. On the other hand, the digital camera 100 determines that the request is not the still image shooting start control (NO in step S503) if the request does not contain "Release.JPG" (303) (if the request instead contains a name of a still image file such as "****.JPG"), and then proceeds to step S507.

In step S504, the digital camera 100 performs the still image shooting start control, and then proceeds to step S505.

In step S505, the digital camera 100 determines whether or not the control in step S504 is successful. If the control in step S504 is successful (YES in step S505), then the digital camera 100 proceeds to step S506. If the control in step S504 results in a failure (NO in step S505), then the digital camera 100 proceeds to step S508.

In step S506, the digital camera 100 generates a still image content as a result of the execution of still image shooting. The still image content generated at this time is a media content. The digital camera 100 proceeds to step S509 after generating the still image content. At this time, the digital camera 100 writes the generated still image content in, for example, the memory 113, and also writes the generated still image in the storage medium 130 simultaneously.

In step S507, the digital camera 100 reads out the requested still image content from the storage medium 130, and proceeds to step S509. In the present exemplary embodiment, if the request does not contain "Release.JPG", the request contains, for example, a name of a file such as "****.JPG" for identifying a still image content. The digital camera 100 reads out the still image content from the storage medium 130 based on the file name.

In step S508, the digital camera 100 generates a content indicating an error in the same format as the format of still image content (i.e., the format of a "***.JPG" file), and then proceeds to step S509.

In step S509, the digital camera 100 determines the content generated in step S506 or S508, or the content read out in step S507 as a transmission content.

In step S510, the digital camera 100 transmits the content (still image content) determined in step S509 to the display apparatus 200 which has transmitted the request (transmission source of the request) (content transmission). After transmitting the still image content, the digital camera 100 returns to step S502 for a next content request, and enters a standby status for reception.

In step S511, the display apparatus 200, which has requested the still image content in step S501 and is in a standby status for reception of the content, receives the still image content transmitted in step S510, and displays the received still image content.

All the display apparatus 200 has to do is to request a still image content based on the content information provided from the digital camera 100 which is a content providing server, and then display (or reproduce) the still image content. More specifically, the display apparatus 200 can control still image shooting on the digital camera 100 without any special configuration, by transmitting a request containing the control content "Release.JPG" (303) associated with the still image shooting start control.

Next, moving image shooting operation will be described. The configuration of the digital camera 100 and the processing flow until providing content information are the same as those in the case of the still image shooting operation. In the present exemplary embodiment, a moving image control content is contained in the provided content information, and the digital camera 100 functions as follows when that moving image control content is requested from the display apparatus 200.

<Moving Image Shooting Operation Sequence>

Figure 6:
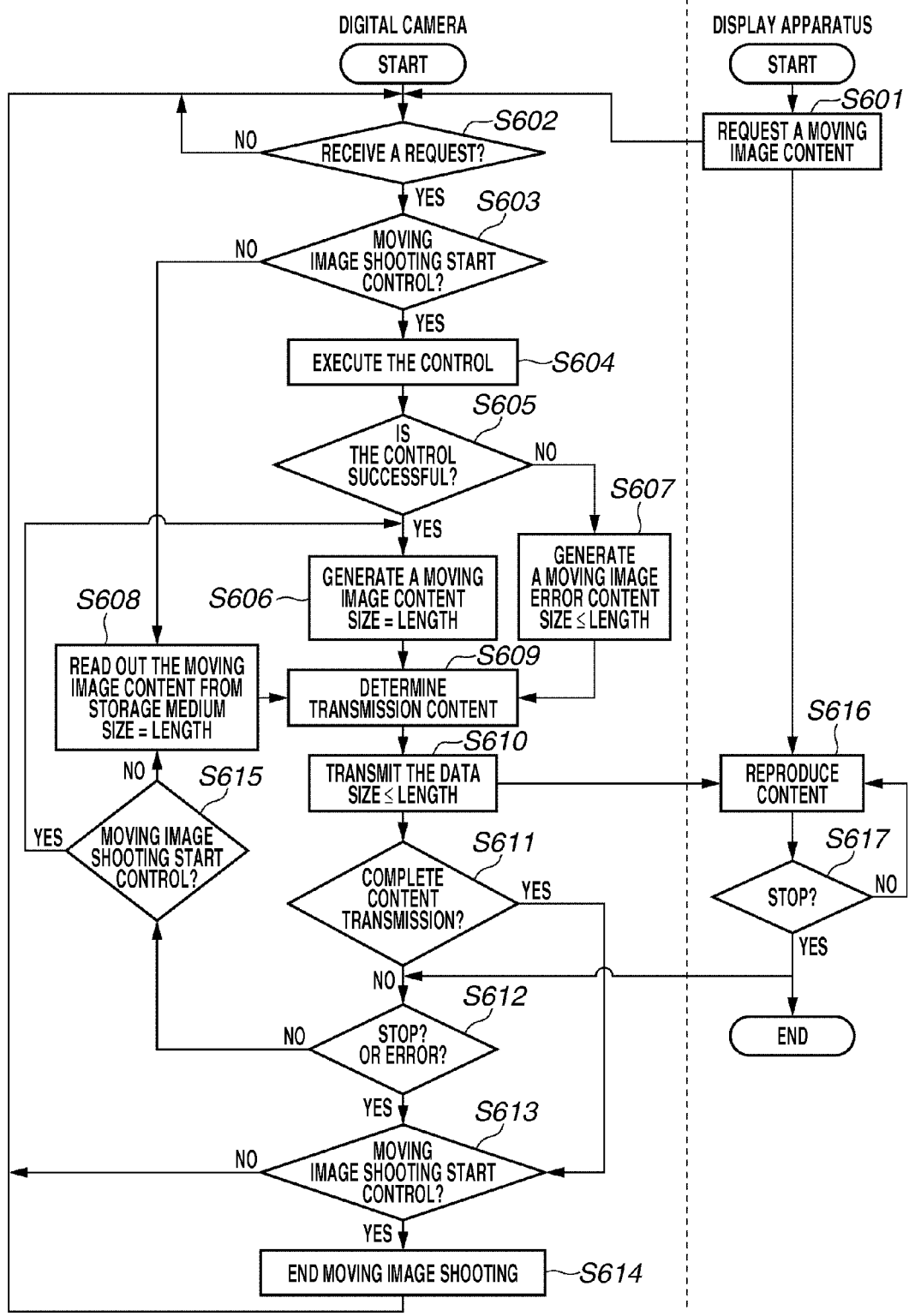
FIG. 6 is a flowchart illustrating a processing flow from when a request for a moving image content is issued by the display apparatus to the digital camera, until the moving image on the display apparatus is reproduced and the moving image shooting is stopped at the digital camera.

FIG. 6 is a flowchart illustrating a processing flow from when a request for a moving image content is issued by the display apparatus 200 to the digital camera 100, until the moving image on the display apparatus 200 is reproduced and the moving image shooting is stopped on the digital camera 100.

In step S601, the display apparatus 200 requests the digital camera 100 to transmit a moving image content.

In step S602, the digital camera 100 determines whether or not the digital camera 100 receives a request (transmission request) from the display apparatus 200. If the digital camera 100 receives a request from the display apparatus 200 (YES in step S602), the digital camera 100 proceeds to step S603. If the digital camera 100 does not receive a request from the display apparatus 200 (NO in step S602), then the digital camera 100 waits until reception of a request.

In step S603, the digital camera 100 determines whether or not the request from the display apparatus 200 is the moving image shooting start control. For example, the digital camera 100 determines whether the request is the moving image shooting start control based on whether the request contains "Movie.MOV" (304). More specifically, the digital camera 100 determines that the request is the moving image shooting start control (YES in step S603) if the request contains "Movie.MOV" (304), and then proceeds to step S604. On the other hand, the digital camera 100 determines that the request is not the moving image shooting start control (NO in step S603) if the request does not contain "Movie.MOV" (304) (if the request instead contains a name of a moving image file such as "****.MOV"), and then proceeds to step S608.

In step S604, the digital camera 100 performs the moving image shooting start control, and then proceeds to step S605.

In step S605, the digital camera 100 determines whether or not the control in step S604 is successful. If the control in step S504 is successful (YES in step S605), then the digital camera 100 proceeds to step S606. If the control in step S604 results in a failure (NO in step S605), then the digital camera 100 proceeds to step S607.

In step S606, the digital camera 100 generates a moving image content as a result of the execution of moving image shooting. The moving image content generated at this time is a media content. If the request contains a size (=length) of moving image content, the digital camera 100 generates a moving image content of that size (hereinafter referred to as "requested size"), and then proceeds to step S609. For example, the digital camera 100 generates a plurality of moving image contents according to, for example, a time of shooting the moving image, in such a manner that the moving image contents each have a size equal to the requested size, and the last of the moving image contents has a size smaller than the requested size. If, for example, the request does not contain a size of moving image content, the digital camera 100 generates a moving image content having a predetermined size. The digital camera 100 writes the generated moving image content in, for example, the memory 113, and also writes the generated moving image content in the storage medium 130 simultaneously.

In step S607, the digital camera 100 generates a content indicating an error in the same format as the format of moving image content (i.e., the format of a "***.MOV" file), and then proceeds to step S609. The digital camera 100 generates this content so that the size of the content becomes smaller than the requested size.

In step S608, the digital camera 100 reads out the requested moving image content from the storage medium 130, and proceeds to step S609. In the present exemplary embodiment, if the request does not contain "Movie.MOV", the request contains, for example, a name of a file such as "****.MOV" for identifying a moving image content. The digital camera 100 reads out a moving image content from the storage medium 130 based on the file name. If the request contains a size of moving image content (requested size), the digital camera 100 reads out the moving image content of the requested size.

In step S609, the digital camera 100 determines the content generated in step S606 or S607, or the content read out in step S608 as a transmission content.

In step S610, the digital camera 100 transmits the transmission data determined in step S609 to the display apparatus 200 in a streaming manner (content transmission).

In step S611, the digital camera 100 determines whether or not the content transmission is completed. If all of the contents are transmitted (YES in step S611), the digital camera 100 proceeds to step S613. If there remains data which should be transmitted (NO in step S611), the digital camera 100 proceeds to step S612.

In step S612, the digital camera 100 determines whether a STOP request is issued from the display apparatus 200, or whether an error occurs during the data transmission. If a STOP request is issued, or an error occurs (YES in step S612), the digital camera 100 proceeds to step S613. If a STOP request is not issued and no error occurs (NO is step S612), the digital camera 100 proceeds to step S615.

In step S615, the digital camera 100 proceeds to the next step based on the determination result in step S603. More specifically, if the digital camera 100 has determined in step S603 that the request from the display apparatus 200 is the moving image shooting start control (YES in step S615), the digital camera proceeds to step S606 to determine the next transmission data (transmission content). On the other hand, if the digital camera has determined in step S603 that the request from the display apparatus 200 is not the moving image shooting start control (NO in step S615), the digital camera 100 proceeds to step S608 to read out the next data from the storage medium 130.

Similarly, in step S613, the digital camera 100 proceeds to the next step based on the determination result in step S603. More specifically, if the digital camera has determined in step S603 that the request from the display apparatus 200 is the moving image shooting start control (YES in step S613), the digital camera 100 proceeds to step S614. On the other hand, if the digital camera 100 has determined in step S603 that the request from the display apparatus 200 is not the moving image shooting start control (NO is step S613), the digital camera 100 ends the series of operations, and returns to step S602.

In step S614, the digital camera 100 stops the moving image shooting, and returns to step S602.

In step S616, the display apparatus 200, which has requested the moving image content in step S601 and is in a standby status for reception of the content, reproduces the received moving image content while receiving the moving image content transmitted in step S610.

In step S617, the display apparatus 200 determines whether or not a user performs a STOP operation while the content is reproduced. If the user performs a STOP operation while the content is reproduced (YES in step S617), the display apparatus 200 transmits a STOP request to the digital camera 100. If the user does not performs a STOP operation while the content is reproduced (NO in step S617), the display apparatus 200 continues the reproduction.

All the display apparatus 200 has to do is to request a moving image content based on the content information provided from the digital camera 100 which is a content providing server, and then reproduce the moving image content. More specifically, the display apparatus 200 can control moving image shooting at the digital camera 100 without any special configuration, by transmitting a request containing the control content "Movie.MOV" (304) associated with the moving image shooting start control.

Next, a control of the digital camera 100 in the present exemplary embodiment will be described which is performed when a setting control content is contained in the provided content information, and the display apparatus 200 requests that setting control content. The configuration of the digital camera 100 and the processing flow until providing content information are the same as those in the case of the still image shooting operation.

<Setting Control Sequence>

Figure 7:
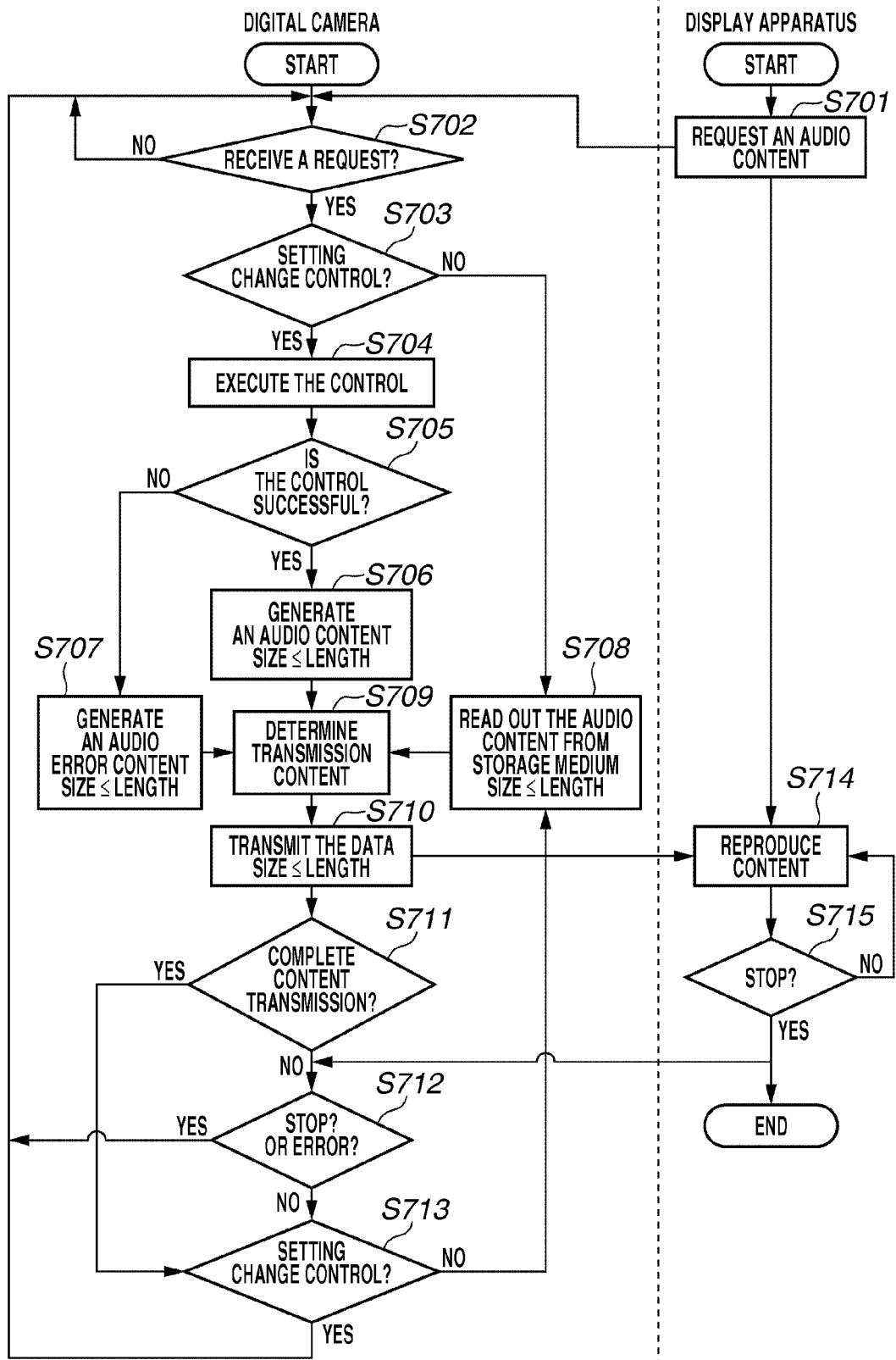
FIG. 7 is a flowchart illustrating a processing flow from when a request for an audio content is issued by the display apparatus to the digital camera, until the audio data is reproduced on the display apparatus.

FIG. 7 is a flowchart illustrating a processing flow from an issue of a request for an audio content from the display apparatus 200 to the digital camera 100 until reproduction of the audio data on the display apparatus 200.

In step S701, the display apparatus 200 requests the digital camera 100 to transmit an audio content.

In step S702, the digital camera 100 determines whether or not the digital camera 100 receives a request (transmission request) from the display apparatus 200. If the digital camera 100 receives a request from the display apparatus 200 (YES in step S702), the digital camera 100 proceeds to step S703. If the digital camera 100 does not receive a request from the display apparatus 200 (NO in step S702), then the digital camera 100 waits until reception of a request In step S703, the digital camera 100 determines whether or not the request from the display apparatus 200 is a setting change. For example, the digital camera 100 determines whether the request is a setting change based on whether the request contains, for example, "ISO100.MP3" (305). More specifically, the digital camera 100 determines that the request is a setting change (YES in step S703) if the request contains, for example, "ISO100.MP3" (305), and then proceeds to step S704. On the other hand, the digital camera 100 determines that the request is not a setting change (NO in step S703) if the request does not contains, for example, "ISO100.MP3" (305) (if the request instead contains a file name of an audio file such as "**.MP3"), and then proceeds to step S708**.

In step S704, the digital camera 100 performs the setting change, and then proceeds to step S705.

In step S705, the digital camera 100 determines whether or not the control in step S704 is successful. If the control in step S704 is successful (YES in step S705), then the digital camera 100 proceeds to step S706. If the control in step S704 results in a failure (NO in step S705), then the digital camera 100 proceeds to step S707.

In step S706, according to the format of the control content associated with the setting change, the digital camera 100 generates a content in this format, and then proceeds to step S709. In the present exemplary embodiment, since the format of the control content associated with the setting change is the MP3 format, the digital camera 100 generates an audio content in the MP3 format reporting that the setting has been changed. If the request contains a size (=length) of audio content, the digital camera 100 generates an audio content of a size equal to or smaller than this size (hereinafter referred to as "requested size"). If, for example, the request does not contain a size of audio content, the digital camera 100 generates an audio content of a size equal to or smaller than a predetermined size.

In step S707, the digital camera 100 generates a content notifying an error in the same format as the format of audio content (i.e., the format of a "*.MP3" file), and then proceeds to step S709. The digital camera 100** generates this content of a size equal to or smaller than the requested size.

In step S708, the digital camera 100 reads out the requested audio content from the storage medium 130, and proceeds to step S709. In the present exemplary embodiment, if the request does not contain, for example, "ISO100.MP3" (305), the request contains, for example, a file name such as "**.MP3" for identifying an audio content. The digital camera 100 reads out an audio content from the storage medium 130 based on the file name. Further, if the request contains a size of audio content (requested size), the digital camera 100** reads out the audio content of a size equal to or smaller than the requested size.

In step S709, the digital camera 100 determines the content generated in step S706 or S707, or the content read out in step S708 as a transmission content.

In step S710, the digital camera 100 transmits the transmission data determined in step S709 to the display apparatus 200 in a streaming manner (content transmission).

In step S711, the digital camera 100 determines whether or not the content transmission is completed. If all of the contents are transmitted (YES in step S711), the digital camera 100 proceeds to step S713. If there remains data which should be transmitted (NO in step S711), the digital camera 100 proceeds to step S712.

In step S712, the digital camera 100 determines whether a STOP request is issued from the display apparatus 200, or whether an error occurs during the data transmission. If a STOP request is issued, or an error occurs (YES in step S712), the digital camera 100 ends the series of operations, and proceeds to step S702. If a STOP request is not issued and no error occurs (NO in step S712), the digital camera 100 proceeds to step S713.

In step 713, the digital camera 100 proceeds to the next step based on the determination result in step S703. More specifically, if the digital camera 100 has determined in step S703 that the request from the display apparatus 200 is a setting change (YES in step S713), then the digital camera 100 ends the series of operations, and proceeds to step S702. On the other hand, if the digital camera 100 has determined in step S703 that the request from the display apparatus 200 is not a setting change (NO in step S713), then the digital camera 100 proceeds to step S708 to read out the next data from the storage medium 130.

In step S714, the display apparatus 200, which has requested the audio content in step S701 and is in a standby status for reception of the content, reproduces the received audio content while receiving the content transmitted in step S710.

In step S715, the display apparatus 200 determines whether or not a user performs a STOP operation while the content is reproduced. If the user performs a STOP operation while the content is reproduced (YES in step S715), the display apparatus 200 transmits a STOP request to the digital camera 100. If the user does not performs a STOP operation while the content is reproduced (NO in step S715), the display apparatus 200 continues the reproduction.

All the display apparatus 200 has to do is to request an audio content based on the content information provided from the digital camera 100 which is a content providing server, and then reproduce the audio content. More specifically, the display apparatus 200 can change the setting in the digital camera 100 without any special configuration, by transmitting a request containing the control content (for example, "ISO100.MP3" (305)) associated with the setting change.

In the present exemplary embodiment, the setting change is associated with an audio content, but may be in the format of still image or moving image, instead of the format of audio content.

In the above-mentioned exemplary embodiment, the digital camera 100 determines whether or not the operation mode thereof is the shooting mode, and switches information to be published between control contents and contents stored in, for example, the storage medium 130. In a second exemplary embodiment, the digital camera 100 publishes contents associated with operation modes (operation mode contents) as initial contents (initial publication), and the display apparatus 200 selects an operation mode of the digital camera 100 by selecting the initial contents.

Figure 8:
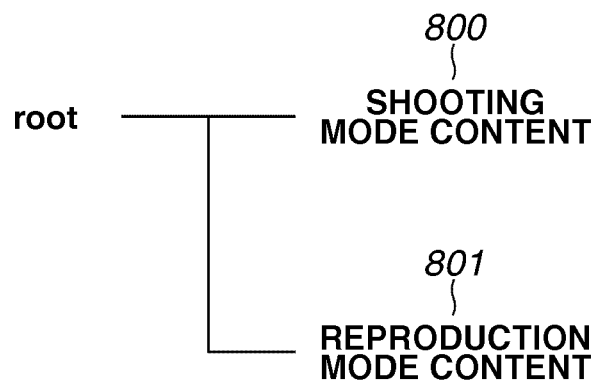
FIG. 8 illustrates an example of initial contents associated with operation modes of the digital camera.

FIG. 8 illustrates an example of initial contents associated with operation modes of the digital camera 100. In the example shown in FIG. 8, a shooting mode content 500 and a reproduction mode content 501 are published as initial contents. The shooting mode content 500 and the reproduction mode content 501 are, for example, folders.

If the shooting mode content 500 is selected on the display apparatus 200 (i.e., if an request containing the shooting mode content 500 is transmitted from the display apparatus 200), the digital camera 100 performs a control so as to operate in the shooting mode (operation mode control). Then, the digital camera 100 publishes the control contents associated with the controls as shown in FIG. 3. On the other hand, if the reproduction mode content 501 is selected on the display apparatus 200, the digital camera 100 performs a control so as to operate in the reproduction mode (operation mode control). Then, the digital camera 100 publishes the contents stored in, for example, the storage medium 130 as shown in FIG. 4.

More specifically, a user can select, on the display apparatus 200, a content that he/she wants the digital camera 100 to publish. Therefore, it is easy for a user to find out which content the digital camera 100 provides, namely, a control content or a normal content.

With respect to the contents that the digital camera 100 publishes according to the respective modes, the digital camera 100 operates in the same manner as the first exemplary embodiment.

In the second exemplary embodiment, the digital camera 100 publishes the shooting mode content associated with the shooting mode as one of the initial contents. However, if the digital camera 100 has a plurality of shooting modes such as an easy shooting mode and a creative shooting mode, the digital camera may publish shooting mode contents associated with the respective shooting modes (easy shooting mode content, creative shooting mode content) as initial contents. Further, the digital camera 100 may change control contents associated with settings to be published, based on items to be selected by a user (for example, ISO, time value (Tv), and aperture value (Av)) according to the respective operation modes.

A third exemplary embodiment performs a control in consideration of the case that, after the digital camera 100 provides contents according to an operation mode, the operation mode is changed.

For example, when the digital camera 100 provides contents according to the shooting mode, the provided contents are control contents. At this time, if the operation mode is changed from the shooting mode to the reproduction mode, the digital camera 100 notifies the display apparatus 200 of the change in the contents. After that, the digital camera 100 may transmit a content indicating an error to the display apparatus 200, when the display apparatus 200 requests a control content. Further, the digital camera 100 may transmit contents to be published in the reproduction mode to the display apparatus 200, when the digital camera 100 receives a request containing information indicating the highest content root from the display apparatus 200.

Due to this arrangement, even if a user changes the operation mode, the digital camera 100 can provide contents according to the operation mode of the digital camera 100 without performing any erroneous operation. When the operation mode is changed from the reproduction mode to the shooting mode, the digital camera 100 functions in a similar manner.

Alternatively, the digital camera 100 may be configured such that the operation mode cannot be changed on the digital camera 100 side when the operation mode is selected by a user on the display apparatus 200 side as in the second exemplary embodiment.

OTHER EMBODIMENTS

Further, the applicable scope of the present invention is not limited to the above-mentioned embodiments. For example, the present invention can be applied to an embodiment formed by appropriately combining the features of the above-mentioned embodiments.

Further, the present invention can be also realized by carrying out the following procedure; a software (program) for realizing the functions of the above-mentioned embodiments is provided to a system or an apparatus through a network or various kinds of storage media, and a computer (or, for example, a central processing unit (CPU) or micro processing unit (MPU)) of the system or the apparatus reads out the program and executes it. Thus, the present invention can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-173408 filed Jul. 24, 2009, which is hereby incorporated by reference herein in its entirety.

What is claimed is:

1. An imaging apparatus communicable with an external apparatus, the imaging apparatus comprising:
a determination unit configured to determine whether an operation mode of the imaging apparatus is a reproduction mode, in which media content is reproduced from a storage medium, or a recording mode;
a notification unit configured to notify media content and control content to the external apparatus, the media content being stored in a storage medium of the imaging apparatus, the control content corresponding to controlling the imaging apparatus; and
a control unit configured to, in accordance with the notified control content being requested from the external apparatus, perform control corresponding to the requested control content,
wherein the notification unit notifies the media content in a case where the determination unit determines that the operation mode of the imaging apparatus is the reproduction mode and notifies the control content in a case where the determination unit determines that the operation mode of the imaging apparatus is the recording mode,
wherein the notification unit further notifies operation mode content associated with the operation mode of the imaging apparatus before notifying the control content, and
wherein the imaging apparatus further comprises an operation mode control unit configured to set an operation mode of the imaging apparatus in accordance with the operation mode content being requested from the external apparatus.

2. The imaging apparatus according to claim 1, wherein the recording mode is a shooting mode.

3. The imaging apparatus to claim 1, further comprising:
a generation unit configured to generate content according to the control of the control unit; and
a transmission unit configured to transmit the content generated by the generation unit to the external apparatus that is a transmission source of a request.

4. The imaging apparatus according to claim 1, wherein the control unit is further configured to cause the imaging apparatus to start shooting a still image file when the external apparatus requests control content associated with starting still image shooting.

5. The imaging apparatus according to claim 1, wherein the control unit is further configured to cause the imaging apparatus to start generating a moving image file when the external apparatus requests control content associated with starting moving image shooting.

6. The imaging apparatus according to claim 1, wherein the control unit is further configured to cause the imaging apparatus to change a setting of an audio file when the external apparatus requests control content associated with changing a setting of audio content.

7. The imaging apparatus according to claim 1, wherein the requested control content includes a predetermined filename.

8. The imaging apparatus according to claim 7, further comprising a decision unit configured to decide a medium type based upon the predetermined filename.

9. The imaging apparatus according to claim 1, wherein the media content is stored in the storage medium of the imaging apparatus before the imaging apparatus is connected to the external apparatus.

10. The imaging apparatus according to claim 1, wherein a name of a file for the control content is different from a name of a file for the media content.

11. The imaging apparatus according to claim 1, wherein a file for the control content and a file for the media content, which corresponds to the control content and is generated according to the control content, have the same file extension.

12. The imaging apparatus according to claim 1, further comprising a generation unit configured to generate the control content associated with a control in a case that the operation mode is determined to be the recording mode.

13. A method for controlling an imaging apparatus communicable with an external apparatus, the method comprising:
    determining whether an operation mode of the imaging apparatus is a reproduction mode, in which media content is reproduced from a storage medium of the imaging apparatus, or a recording mode;
    notifying the media content and control content to the external apparatus, the media content being stored in a storage medium of the imaging apparatus, the control content corresponding to controlling the imaging apparatus; and
    performing control corresponding to the control content, in accordance with the control content being requested from the external apparatus,
    wherein notifying the media content and the control content includes notifying the media content in a case where the operation mode of the imaging apparatus is determined to be the reproduction mode and notifying the control content in a case where the operation mode is determined to be the recording mode,
    wherein the method further comprises notifying operation mode content associated with the operation mode of the imaging apparatus before notifying the control content, and
    wherein the imaging apparatus sets an operation mode in accordance with the operation mode content being requested from the external apparatus.

14. A non-transitory computer-readable storage medium storing a program which, when executed by a computer, causes an imaging apparatus to perform a method comprising:
    determining whether an operation mode of the imaging apparatus is a reproduction mode, in which media content is reproduced from a storage medium of the imaging apparatus, or a recording mode;
    notifying the media content and control content to an external apparatus, the media content being stored in a storage medium of the imaging apparatus, the control content corresponding to controlling the imaging apparatus; and
    performing control corresponding to the control content, in accordance with the control content being requested from the external apparatus, wherein notifying the media content and the control content includes notifying the media content in a case where the operation mode of the imaging apparatus is determined to be the reproduction mode and notifying the control content in a case where the operation mode is determined to be the recording mode,
    wherein the method further comprises notifying operation mode content associated with the operation mode of the imaging apparatus before notifying the control content, and
    wherein the imaging apparatus sets an operation mode in accordance with the operation mode content being requested from the external apparatus.

15. An imaging apparatus communicable with an external apparatus, the imaging apparatus comprising:
    a determination unit configured to determine an operation mode of the imaging apparatus;
    a notification unit configured to notify media content and control content to the external apparatus, the media content being stored in a storage medium of the imaging apparatus before the imaging apparatus is connected to the external apparatus, the control content corresponding to controlling the imaging apparatus; and
    a control unit configured to, in accordance with the control content being requested from the external apparatus, perform control corresponding to the requested control content,
    wherein the notification unit determines whether the notification unit notifies the control content in accordance with a determination result of the determination unit,
    wherein the notification unit further notifies operation mode content associated with the operation mode of the imaging apparatus before notifying the control content, and
    wherein the imaging apparatus further comprises an operation mode control unit configured to set an operation mode of the imaging apparatus in accordance with the operation mode content being requested from the external apparatus.

16. The imaging apparatus according to claim 15, wherein the requested control content includes a predetermined filename.

17. The imaging apparatus according to claim 16, further comprising a determination unit configured to determine a storage medium type based upon the predetermined filename.

18. The imaging apparatus according to claim 15, wherein a name of a file for the control content is different from a name of a file for the media content.

19. The imaging apparatus according to claim 15, wherein a file for the control content and a file for the media content, which corresponds to the control content and is generated according to the control content, have the same file extension.

20. The imaging apparatus according to claim 15, further comprising a receiving unit configured to receive a request for notification of contents from the external apparatus,
    wherein the notification unit notifies the contents in response to receiving by the receiving unit the request for notification of contents from the external apparatus.

21. The imaging apparatus according to claim 20, wherein the determination unit determines the operation mode of the imaging apparatus before the receiving unit receives the request for notification of contents from the external apparatus.

22. The imaging apparatus according to claim 15, wherein the determination unit determines the operation mode of the imaging apparatus before the notification unit notifies the contents.

23. The imaging apparatus according to claim 15, further comprising an operation unit configured to receive an operation from a user,
   wherein the operation mode of the imaging apparatus is changed in accordance with the operation which is received by the operation unit.

24. A method for controlling an imaging apparatus communicable with an external apparatus, the method comprising:
   determining whether an operation mode of the imaging apparatus is a reproduction mode, in which media content is reproduced from a storage medium of the imaging apparatus, or a recording mode;
   notifying media content and control content to the external apparatus, the media content being stored in a storage medium before the imaging apparatus is connected to the external apparatus, the control content corresponding to controlling the imaging apparatus;
   performing control corresponding to the control content in accordance with the control content being requested from the external apparatus;
   determining whether the imaging apparatus notifies the control content in accordance with a determination result of the determining;
   notifying operation mode content associated with the operation mode of the imaging apparatus before notifying the control content; and
   setting an operation mode of the imaging apparatus in accordance with the operation mode content being requested from the external apparatus.

* * * * *